March 22, 1955 R. E. SELTZER 2,704,624
SUPPORT FOR DISTRIBUTOR SLIDE PLATE
Filed Jan. 14, 1953 2 Sheets-Sheet 1

INVENTOR.
ROBERT E. SELTZER
ATTORNEYS

March 22, 1955 R. E. SELTZER 2,704,624
SUPPORT FOR DISTRIBUTOR SLIDE PLATE
Filed Jan. 14, 1953 2 Sheets-Sheet 2

INVENTOR.
ROBERT E. SELTZER
BY
ATTORNEYS

United States Patent Office 2,704,624
Patented Mar. 22, 1955

2,704,624

SUPPORT FOR DISTRIBUTOR SLIDE PLATE

Robert E. Seltzer, Bellevue, Ohio, assignor to Spred-All, Inc., Bellevue, Ohio, a corporation of Ohio Application January 14, 1953, Serial No. 331,202

6 Claims. (Cl. 222—485)

This invention relates to agricultural material spreaders, particularly to spreaders of the type adapted for handling chemical fertilizers and other soil treating materials that are in granular form.

In agricultural material spreaders of the nature referred to some considerable difficulty has been experienced in properly regulating the delivery of materials in order to obtain the proper distribution thereof. This comes about because some of the material is dispensed in very small amounts, as little as twenty-five pounds per acre, while other materials might be dispensed at rates of several hundred pounds per acre. Further, some of the material, as in fine granular material, is non-hygroscopic and thus has no tendency to absorb moisture, while other materials do absorb moisture and become sticky and difficult to feed.

In the process of handling this variety of materials it has been found that the fine granular materials have a tendency to become lodged between the bottom of the dispensing hopper and the regulating slide plate which makes it difficult to adjust the slide plate and can even force the slide plate outwardly from the bottom of the hopper to such an extent that the regulating of the slide plate is materially affected.

The primary object of the present invention is to provide an improved dispenser of the nature described having a slide plate on the bottom thereof with a novel-type of support for slidably supporting the slide plate on the bottom of the hopper.

Another object is the provision of a supporting arrangement for the slide plate on the bottom of the hopper of the nature described so arranged that the slide plate will be held firmly against the bottom of the hopper but at the same time will be readily adjustable therealong.

A further object is the provision of a supporting arrangement for a slide plate of the nature described which will readily permit the slide plate to be removed for frequent cleaning thereof that is necessary in cases of intensive use.

A still further object is the provision of a slide plate for mounting on the bottom of a material distributor and a supporting mechanism thereof embodying the advantages referred to above and which is inexpensive to construct and embody in a distributor structure.

These and other objects and advantages of this invention will become more apparent upon reference to the following specification taken in connection with the accompanying drawings, in which.

Figure 1:
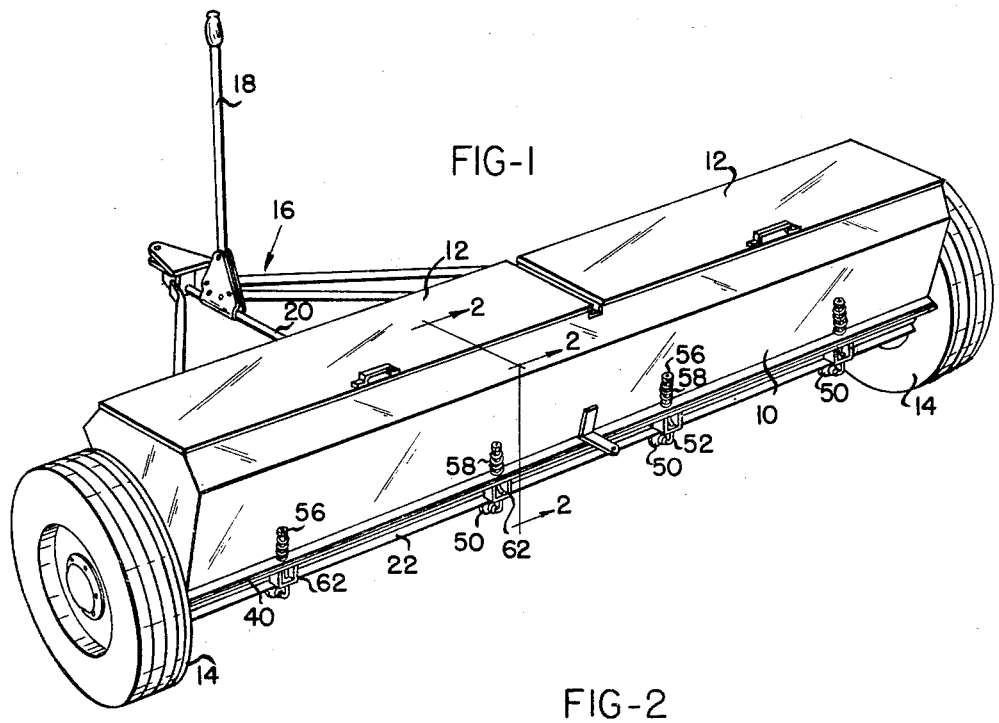
Figure 1 is a perspective view of a typical agricultural material spreader adapted for being constructed in accordance with my invention.

Referring to the drawings somewhat more in detail, the distributor arrangement illustrated in Figure 1 comprises a hopper 10 having filling openings at the top closed by the lids 12. At each end of the hopper 10 is a ground wheel 14 and fastened to the front side of the hopper and extending outwardly therefrom is a hitch structure generally indicated at 16 for connecting the distributor with a source of motive power.

Mounted on the hitch structure so as to be adjustable by the operator of a tractor pulling the distributor is a lever 18 connected at its lower end to a rock shaft 20 and which extends backwardly to the hopper and is connected through a suitable linkage with a slide plate 22 mounted on the bottom of the hopper.

Figure 2:
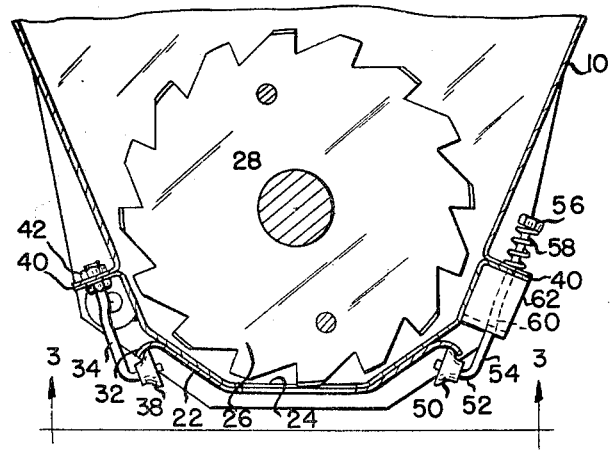
Figure 2 is a transverse section thereof indicated by line 2—2 on Figure 1 showing the bottom portion of the hopper with the slide plate and the support therefor in rotary feeding blade within the hopper.
Figure 3:
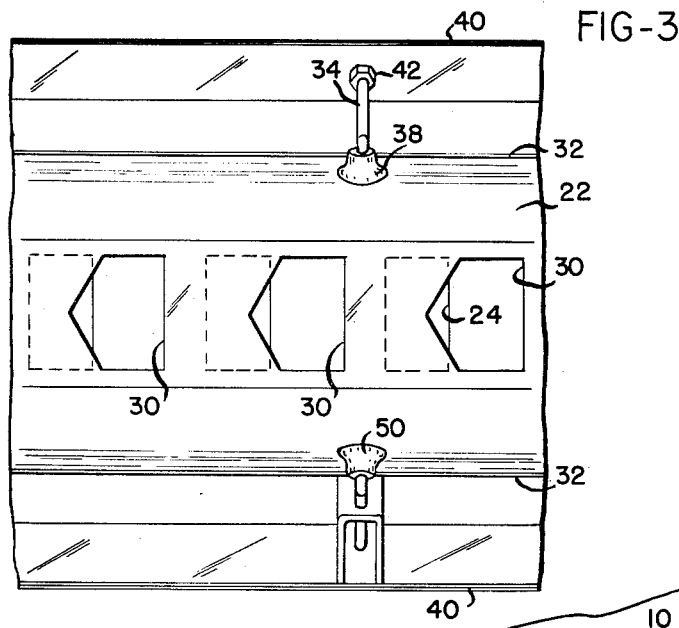
Figure 3 is a bottom plan view looking up in the direction of the arrows 3—3.

Turning now to Figures 2 and 3, it will be noted that the bottom of the hopper is provided with a plurality of substantially rectangular apertures or feed openings 24 through which the material to be dispensed is fed by the rotary feeding blades 26 mounted on the shafts 28 that are connected drivingly with the ground wheels 14.

As will best be seen in Figure 2, each feed blade 26 extends at least part way through its associated aperture 24 in the bottom of the hopper, and in this manner the feeding of sticky materials is insured while at the same time the feeding of the more readily flowable substantially dry granular materials is more closely regulated.

In order to regulate the effective size of the feed openings 24 the slide plate 22 on the bottom of the hopper is provided with a plurality of spaced apertures 30 adapted for variable registration with the feed openings 24 according to the axial positions at which the said slide plate is adjusted along the bottom of the hopper. This adjustment, of course, is accomplished by availing of lever 18 which operates through rock shaft 20.

The bottom of the hopper consists of a multi-sided configuration with the apertures 24 being located in the bottom wall and with the slide plate 22 extending across the bottom wall and at least part way up the adjacent wall portions.

The outermost side edges of the slide plate are bent over as indicated at 32 to form downwardly concave gutters or roller tracks. These roller tracks are availed of to provide support for the slide plates by securing to the front side of the hopper a plurality of rods 34 having inwardly turned lower end portions 36 on which are rotatably mounted the rollers 38 that engage the adjacent roller track. The upper portion of the hopper and the bottom portion of the hopper are preferably connected together by the mating and outwardly projecting flanges 40, and these flanges being advantageously availed of for providing support for the rods 34 by apertures suitably located in the flanges and through which the rods extend to be clamped in position by the nuts 42.

Figure 4:
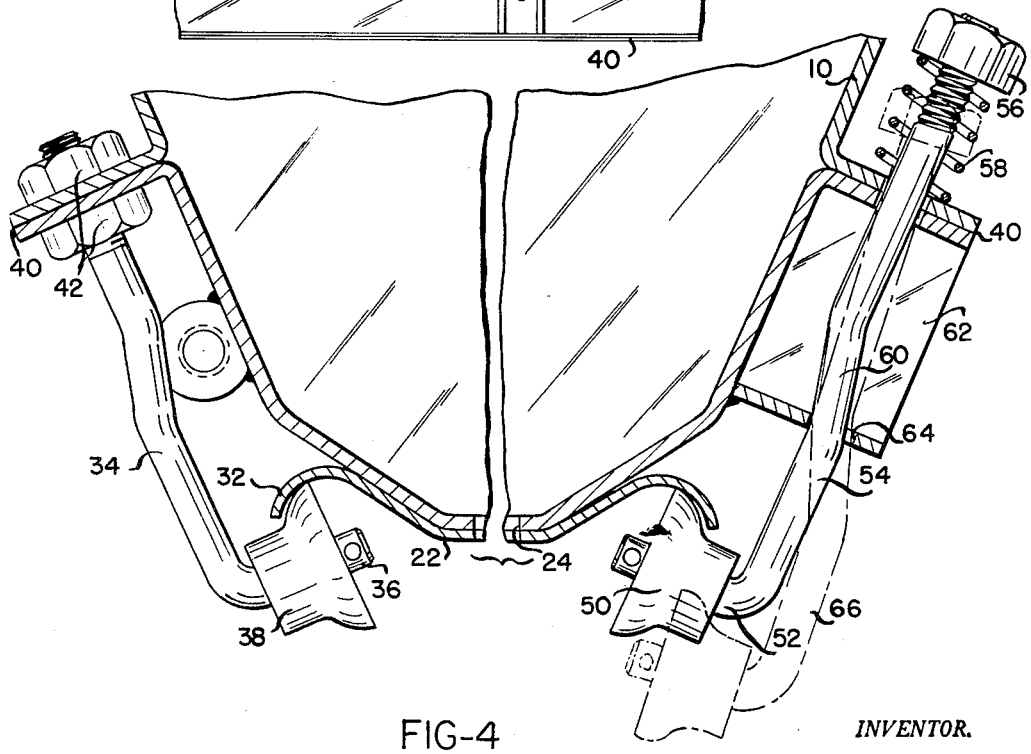
Figure 4 is still another sectional view through the bottom of the hopper but drawn at greatly enlarged scale over the showing of Figure 2.

As will best be seen in Figure 4, each rod 34 has an offset therein and the amount of offset indicated for the rod, together with the particular construction of the roller 38 and the shape of the roller track 32 and the manner in which it engages the roller, provides for a minimum of twisting torque being exerted on rod 34 during reciprocatory movement of slide plate 22. This makes for easy movement of the slide plate and thus permits exact adjustment thereof to any desired position by means of lever 18. This enables the operator to maintain the exactly proper rate of discharge of material from the hopper that is necessary to do a proper job.

At the back of the hopper there are provided still other roller supports for slide plate 22, and these roller supports are preferably arranged in co-planar relationship with the previously described roller supports. The principal difference between the roller supports at the rear of the hopper and the front of the hopper is that those at the rear are spring urged upwardly in order to hold the slide plate in proper position on the bottom of the hopper and also so that they can be moved manually downwardly to release the slide plate when it is to be removed for cleaning.

In connection with the rear roller supports, each thereof comprises a roller 50 corresponding with roller 38 on the front roller support, and which roller 50 is mounted on the lower inturned end 52 of a rod 54 extending up the side of the hopper and through an aperture in the rear flange 40 between the hopper bottom and the hopper top to have a nut 56 mounted on the upper end and between which and the top of the rear flange 40 there bears a compression spring 58.

Rod 54, similar to the rod 34, has an inward offset 60 which is effective for reducing even to the point of elimination any torque on rod 54 due to axial movements of slide plate 22 along the bottom of the hopper.

Secured to the hopper bottom directly beneath flange 40 in the position of each of rods 54 is a U-shaped bracket 62 having an aperture 64 for slidably receiving rod 54. The provision of bracket 62 insures against roller 50 from becoming dislodged from the slide plate for any reason except when it is deliberately dislodged because aperture 54 prevents movement of rod 54 toward and away from the hopper more than a small predetermined amount.

The aperture 64 and bracket 62 are also of advantage in facilitating removing of the slide plate when this is desired or necessary for cleaning due to the fact that the aperture 64 is located at about the bottom of the offset 60 so that when rod 54 is pushed downwardly the said offset portion will cam along the inner side of aperture 64 until the rear roller support occupies the dot-dash position 66, and in which position it will be observed the rod 54 can either be rotated to bring the roller 50 thereon to inoperative position or the slide plate 22 can be removed while holding the support rod 54 in its dot-dash position.

I have found plastic materials to be suitable for the construction of the rollers 38 and 50, but this invention also contemplates construction of these elements of metal and substantially equivalent results will obtain.

From the foregoing it will be seen that what I have provided is a relatively simple and inexpensive support for the slide plate of a distributing mechanism of the nature described, but which support is extremely accurate as to positioning of the plate, permits relatively free reciprocation thereof along the bottom of the hopper thus enabling precise adjustment of the slide plate to control the flow of material from the distributor, and is so arranged as to permit quick and easy removal and replacement of the slide plate.

It will be understood that this invention is susceptible to modification in order to adapt it to different usages and conditions, and, accordingly, it is desired to comprehend such modifications within the scope of the appended claims.

I claim:

1. In a support for the slide plate on the bottom of the hopper of a distributor of the nature described; a plurality of rigid rods distributed along the front and back sides of the hopper, the lower ends of said rods being turned inwardly, and rollers on the said inturned ends of said rods engaging the opposite side edges of said slide plate, the rods along one side of said hopper being rigidly fixed thereto, and the rods along the other side of said hopper being resiliently urged upwardly thereon, means on the said other side of the hopper for each rod forming a pair of vertically spaced apertures for receiving the rod, and each of said rods on the other side of the hopper comprising an offset portion normally located between said apertures whereby manual movement of said rods downwardly will cam their lower ends laterally relative to the edge of the slide plate, the offset being arranged so said lateral movement is away from the edge of the slide plate so as to disengage the plate from the said rollers.

2. In combination; an elongated hopper for a distributor having feed openings distributed thereon, a slide plate slidable along the bottom of said hopper having openings adapted for variable registration with said feed openings, said slide plate having downwardly concave roller tracks along its opposite side edges, rollers spaced along said tracks, and rigid L-shaped rods supporting said rollers at their lower ends and having their upper ends supported on said hopper, the rods along one side of said hopper being rigid therewith and the rods along the other side of said hopper being spring urged upwardly thereon, each said rod having its said lower end offset outwardly from the side of the hopper relative to the upper end of the said rod to reduce the twisting effect on the rod due to movement of said slide plate.

3. In combination; a hopper for a material distributor of the nature described comprising; front and back walls and a bottom portion joining said walls and having feed openings therein, the bottoms of said front and back walls and the top edges of said bottom portion being flanged for connecting the walls to the bottom portion, a slide plate slidable along the bottom of the bottom portion for regulating the size of the said feed openings, said slide plate having downwardly concave roller tracks along its side edges, rollers distributed along said tracks engaging and fitting said tracks, rigid rods supporting said rollers and extending upwardly through the flanges connecting the walls with the hopper bottoms, and means rigidly clamping the rods on one side of the hopper to the adjacent flange while resiliently supporting the rods on the other side of the hopper on the adjacent flange.

4. In combination; a hopper for a distributor of the nature described comprising front and back walls and a bottom portion joining said walls and having feed openings therein, said walls and said bottom portion being outwardly flanged where they are connected, a slide plate on the bottom of the bottom portion adjustable lengthwise thereof for regulating the size of said feed openings, said slide plate having downwardly concave tracks along its side edges, rollers distributed along said tracks engaging and fitting said tracks, rigid rods extending downwardly through said flanges and having their lower ends turned in and rotatably supporting said rollers, each said rod having downwardly and outwardly inclined offset between its ends whereby a minimum of torsion is exerted on said rods by movement of said slide, the rods on one side of said hopper being rigid with the associated flange, and spring means between the rods on the other side of the hopper and the flange associated therewith for urging said rods upwardly.

5. In a supporting arrangement for the regulating slide plate and the bottom of the hopper of a distributor of the nature described; said slide plate having a downwardly concave track along at least one side edge, rollers spaced along said slide plate engaging said track, a rigid L-shaped rod for each roller rotatably supporting the said roller on its short leg and having its other leg extending upwardly along the adjacent side of the hopper, a U-shaped bracket rigid with the hopper for each said rod having an aperture in its bottom wall through which the rod passes, means spring urging the rods upwardly to hold the slide plate in position, and each rod having an offset therein extending upwardly from said aperture whereby downward movement of said rods will cause the lower ends thereof on which the rollers are carried to swing outwardly from the slide plate to release the slide plate from the hopper.

6. In a supporting arrangement for the regulating slide plate and the bottom of the hopper of a distributor of the nature described; said slide plate having a downwardly concave track along at least one side edge, rollers spaced along said slide plate engaging said track, a rigid L-shaped rod for each roller rotatably supporting the said roller on its short leg and having its other leg extending upwardly along the adjacent side of the hopper, a U-shaped bracket rigid with the hopper for each said rod having an aperture in its bottom wall through which the rod passes, means spring urging the rods upwardly to hold the slide plate in position, and each rod having an offset therein extending upwardly from said aperture whereby downward movement of said rods will cause the lower ends thereof on which the rollers are carried to swing outwardly from the slide plate to release the slide plate from the hopper, said offset being of such a size that movements of said slide plate impose substantially no twisting forces on said rods tending to rotate them about their axes.

References Cited in the file of this patent

UNITED STATES PATENTS

| | | |
|---|---|---|
| 2,510,231 | Juzwiak | June 6, 1950 |
| 2,550,303 | Simpson | Apr. 24, 1951 |
| 2,624,492 | Seltzer | Jan. 6, 1953 |
| 2,626,729 | Ajero | Jan. 27, 1953 |
| 2,643,031 | Lowry | June 23, 1953 |